(12) United States Patent
Maruyama et al.

(10) Patent No.: US 7,284,488 B2
(45) Date of Patent: Oct. 23, 2007

(54) GAS GENERATOR (75) Inventors: Junya Maruyama, Himeji (JP);
Kazumasa Kurita, Himeji (JP);
Akihiko Tanaka, Himeji (JP);
Yoshiyuki Kishino, Himeji (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/519,408

(22) PCT Filed: Jul. 18, 2003

(86) PCT No.: PCT/JP03/09143

§ 371 (c)(1),
(2), (4) Date: Jan. 5, 2005

(87) PCT Pub. No.: WO2004/012965

PCT Pub. Date: Feb. 12, 2004

(65) Prior Publication Data
US 2006/0150855 A1   Jul. 13, 2006

(30) Foreign Application Priority Data
Jul. 19, 2002   (JP) .............................. 2002-210864

(51) Int. Cl.
*F42B 3/12*   (2006.01)
*F42B 3/103*   (2006.01)
(52) U.S. Cl. .............................. 102/202.9; 102/202.11; 102/202.14
(58) Field of Classification Search ............. 102/202.9, 102/202.11, 202.8, 202.7, 202.12, 202.14
See application file for complete search history.

(56) References Cited

U.S. PATENT DOCUMENTS

| 4,561,675 A | * | 12/1985 | Adams et al. | ............... 280/734 |
| 5,131,679 A | * | 7/1992 | Novak et al. | ............... 280/736 |
| 6,823,796 B1 | * | 11/2004 | Amano | .................. 102/202.14 |

FOREIGN PATENT DOCUMENTS

| EP | 1 043 201 | 10/2000 |
| JP | 2000-329500 | 11/2000 |
| JP | 2001-21293 | 1/2001 |
| JP | WO 01/26938 A1 * | 4/2001 |
| JP | 2001-124498 | 5/2001 |
| JP | 2001-260815 | 9/2001 |
| JP | 2002-200420 | 7/2002 |
| JP | 2002-200966 | 7/2002 |
| WO | 01/51192 | 7/2001 |
| WO | 01/51193 | 7/2001 |

* cited by examiner

*Primary Examiner*—Stephen M. Johnson
(74) *Attorney, Agent, or Firm*—Oblon, Spivak, McClelland, Maier & Neustadt, P.C.

(57) ABSTRACT

A gas generator comprising a first cup case 3 packing therein gas generant 2 to generate gas by the burning of it, a squib 5 having a second cup case E arranged in an inside of the first cup case 3 and containing an ignition charge D, a squib case 7 having a hole 20 and covering the second cup case E, and a holder 6 to hold the squib case 7 and second cut case E by crimping, wherein the holder 6 has holes 13, 14 for allowing passage of electrode pins 11, 12 of the squib 5, one for each of the electrode pins 11, 12.

2 Claims, 8 Drawing Sheets

Prior Art

Prior Art

| | Amount of smokeless gunpowder (mg) | Electrode pin setting position | Result |
|---|---|---|---|
| Comparative Example | 950 | 3 positions | Electrode pins flied at each of three positions |
| Example 1 | 950 | 3 positions | No electrode pins flied at any of three positions |
| Example 2 | 1,000 | 3 positions | No electrode pins flied at any of three positions |
| Example 3 | 1,200 | 3 positions | No electrode pins flied at any of three positions |
| Example 4 | 1,400 | 3 positions | No electrode pins flied at any of three positions |
| Example 5 | 1,600 | 3 positions | No electrode pins flied at any of three positions |
| Example 6 | 1,700 | 3 positions | No electrode pins flied at any of three positions |

GAS GENERATOR

TECHNICAL FIELD

The present invention relates to a gas generator used for an automobile seatbelt pretensioner, for example. More particularly, the present invention relates to a gas generator that can surely prevent a drop-out of electrode pins of a squib of the gas generator in a high-temperature state.

BACKGROUND ART

The seatbelt pretensioner is known as one of the safety systems to protect a vehicle occupant from the shock in a car collision. The seatbelt pretensioner is structured to operate a cylinder by a large amount of high-temperature and high-pressure gas generated by the gas generator. The gas generator, which is used to operate the cylinder, not an airbag, is structured to generate a relatively small amount of gas and to inject the high-temperature and high-pressure gas directly to the cylinder without any intermediary of filter or coolant. Usually, this gas generator includes a squib containing an ignition charge to be ignited by an electric current through the squib, a first cup case containing gas generant, and a holder to fixedly hold the squib and the first cup case.

Figure 3:
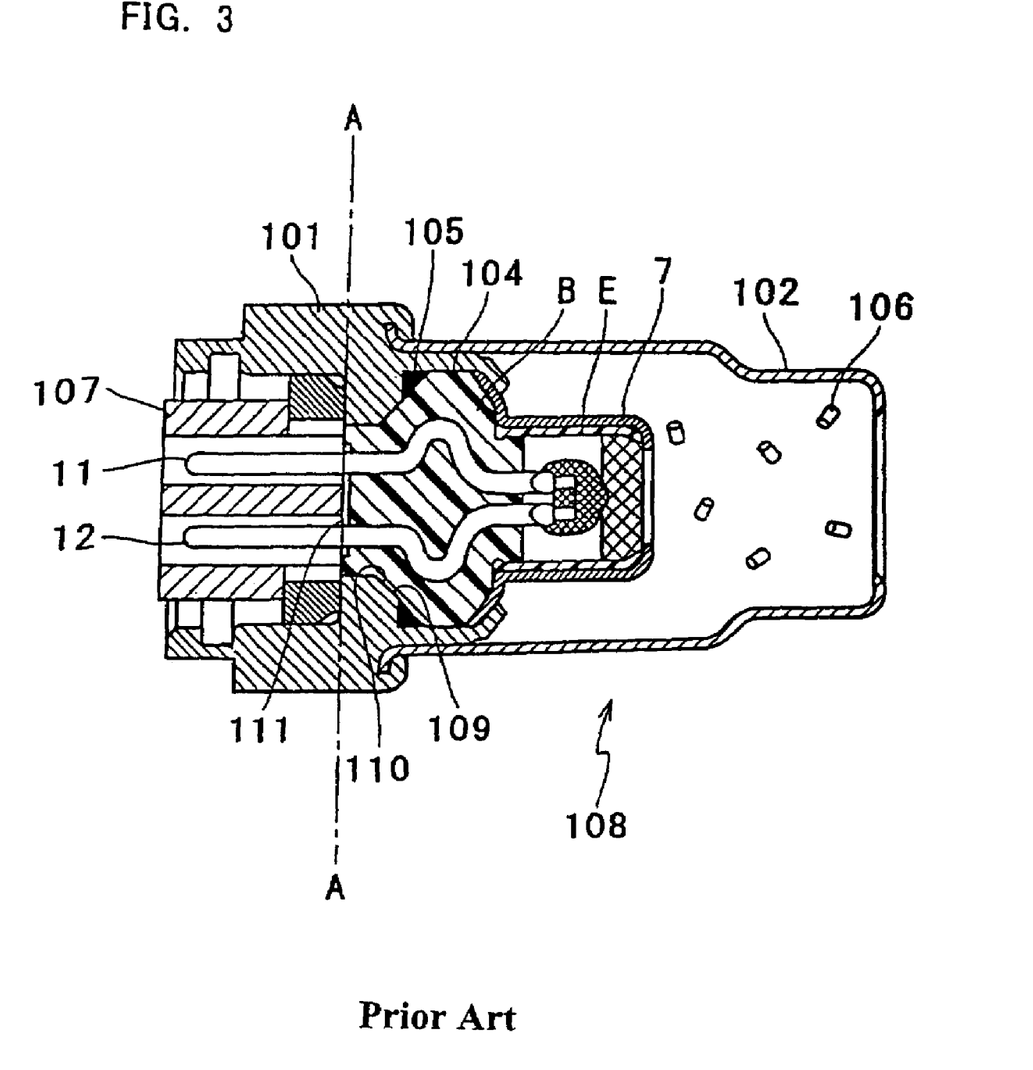
FIG. 3 is a schematic sectional view of a conventional gas generator.

An example of a conventional gas generator used for the seatbelt pretensioner is shown in FIG. 3. The gas generator 108 of FIG. 3 comprises gas generant 106 that generates a large amount of gas by the ignition, a squib 104 containing an ignition charge that is ignited by the passage of electric current through the squib, a first cup case 102 containing the gas generant, a holder 101 to hold the squib 104 and the first cup case 102 concentrically and seal the gas generant 106 and the squib 104 shown in FIG. 5 in an inner space between the holder 101 and the first cup case 102, an O-ring 105 disposed in a gap between the squib 104 and the holder 101 to prevent moisture from entraining from the gap therebetween, and a shorting clip 107 to keep two electrode pins 11, 12 standing from the squib 104 in a shorted state. Also, a sealant, not shown, is applied to the gap between the first cup case 102 and the holder 101 to prevent moisture from entraining the gap therebetween.

Figure 5:
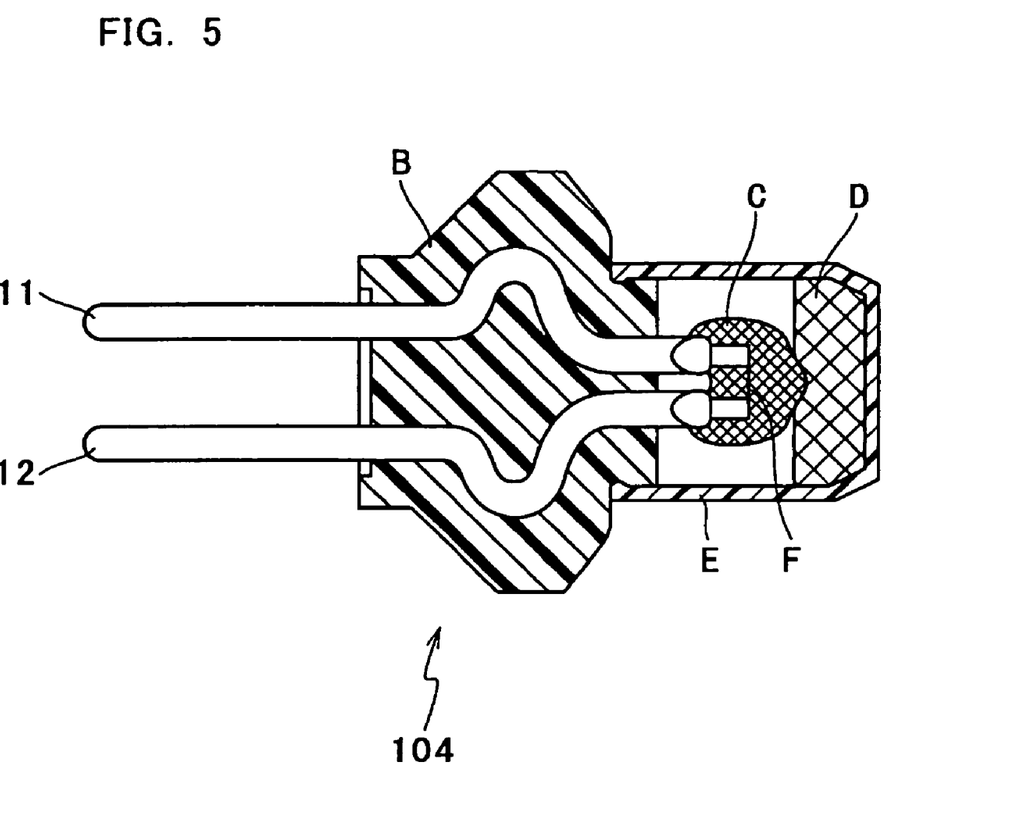
FIG. 5 is a schematic sectional view showing a known squib used in the gas generator.

The squib 104 comprises a second cup case E containing an ignition charge D, header B inserted and fitted in the second cup case E to seal the ignition charge D in an interior of the second cup case E, and two electrode pins 11, 12 of metal rods extending through the closing plug B, as shown in FIG. 5. The electrode pins 11, 12 project in the interior of the second cup case E and are electrically connected to each other at their front ends through an electric bridge-circuit wire F. The electric bridge-circuit wire F is covered with fuse head C contacting with the ignition charge D. The closing plug B is formed of a resin in order to provide electrical insulation between the respective electrode pins 11, 12 except the portions thereof corresponding to the electric bridge-circuit wire.

The squib 104 is held by the holder 101, with its tapered portion 109 contacting with a tapered portion 110 of the holder 101, as shown in FIG. 3. Also, the bottom thereof 111 of the closing plug B of the squib 104 is exposed to the outside (See FIG. 4(a)). Incidentally, the closing plug B formed of resin may be softened by the heat resulting from the ignition in the high-temperature state. Due to this, there is a possibility that the electrode pins 11, 12 in the closing plug B may be dropped out together with the closing plug B when softened and reduced in retention.

It is an object of the present invention to provide a gas generator with enhanced safety that can prevent a drop-out of the electrode pins standing from the squib of the gas generator when ignited in a high temperature state.

DISCLOSURE OF THE INVENTION

In order to solve the problem mentioned above, the present invention provides a gas generator comprising a first cup case packing therein gas generant to generate gas by burning, a squib having a second cup case arranged in an inside of the first cup case and containing an ignition charge, a squib case having a flame leading hole and covering the second cup case, and a holder to hold the squib case and second cup case by crimping, wherein the holder has holes for allowing passage of electrode pins of the squib, one for each of the electrode pins. Since the holder has the holes for permitting the passage of the respective electrode pins of the squib, one for each of the electrode pins, even when the closing plug formed of resin and forming the squib is softened at the ignition in the high-temperature state, such as, for example, when the squib is ignited by some cause during transportation and the like, not only the drop-out of the closing plug but also the drop-out of the electrode pins provided in the squib can be prevented in order to assure the reliability even in the high-temperature state.

Also, the area of the hole is made to be in range of two times to ten times as large as a cross-section area of the electrode pin. This construction can prevent the electrode pins from being shorted with each other even when the holder is formed of a metal. It can also prevent the electrode pins from being dropped out from the holder by the holes even when the closing plug formed of resin and forming the squib is softened at the ignition in the high-temperature state.

Also, the squib comprises a second cup case to contain the ignition charge, a closing plug inserted in and fitted in the second cup case to seal the ignition charge in the second cup case, and the electrode pins of two metal rods extending through the closing plug and projecting out therefrom, wherein root portions of the respective electrode pins projecting from the closing plug are covered with respective projecting portions integrally formed with the closing plug, and the projecting portions are inserted in the holes, respectively. With this construction, when the electrode pins are inserted through the respective holes, the projecting portions of the closing plug are fitted in the respective holes, so that looseness of the closing plug is reduced and also insulation between the electrode pins and the holder is ensured.

Preferably, the holder is formed of metal such as aluminum, iron, and stainless. Since the holder formed of metal has greater heat resistance than the resin and the like, the holder can reliably prevent drop-out of the electrode pins from the holder as well as the drop-out of the closing plug at the ignition in the high-temperature state.

Also, the present invention provides a holder comprising a tapered portion for allowing insertion of header of a squib for connection of the closing plug to the holder by crimping, a crimping lug for holding the closing plug of the squib by crimping, a crimping lug for holding a first cup case by crimping, and a bottom of the tapered portion, wherein the bottom has holes for permitting passage of electrode pins of the squib, respectively. Since the holder has, in the bottom of the tapered portion, the holes for permitting the passage of the respective electrode pins, the holder can surely prevent both the drop-out of the closing plug and the drop-out of the electrode pins from the holder at the ignition in the high-temperature state.

BEST MODE FOR CARRYING OUT THE INVENTION

In the following, an example of certain preferred embodiments of a gas generator of the present invention will be described with reference to accompanying drawings.

Figure 1:
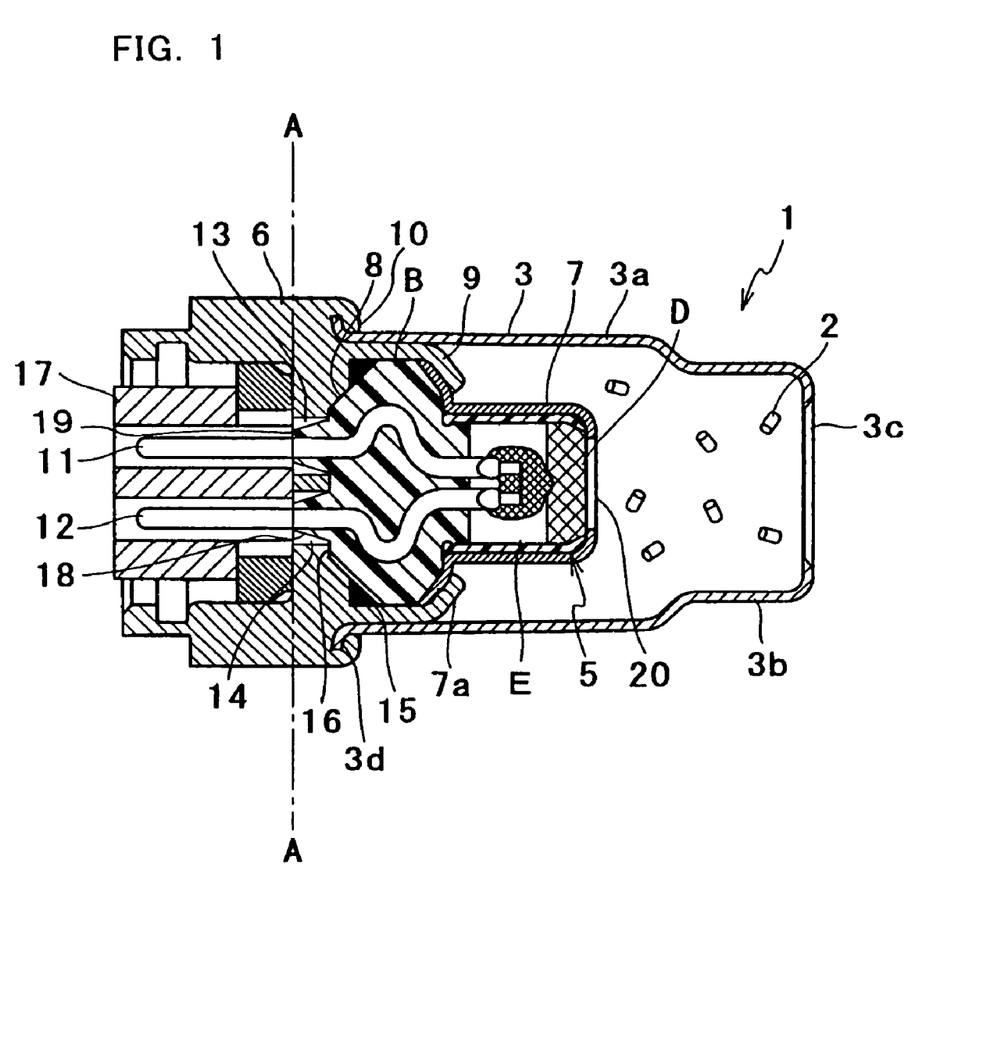
FIG. 1 is a schematic sectional view of an example of an embodiment of a gas generator of the present invention.

In FIG. 1, a gas generator 1 comprises a first cup case 3 packed with gas generant 2 to generate gas by the burning, a squib 5 disposed in the inside of the first cup case 3 and having a second cup case E containing an ignition charge, a squib case 7 covering the second cup case E and having a hole 20, and a holder 6 having crimping lug 9 to hold the squib case 7 and the second cup case E by crimping the lug 9.

Figure 2:
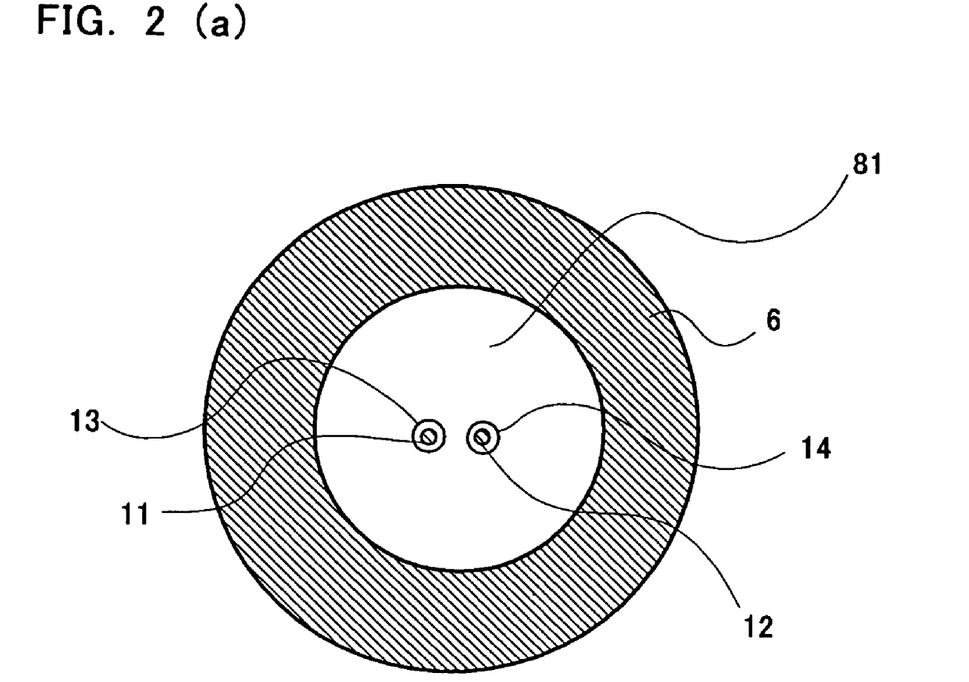
FIG. 2(a) is a sectional view of the gas generator taken along line A-A of FIG. 1.
FIG. 2(b) is an external view of a holder of the present invention used as viewed from a bottom thereof in FIG. 1.
FIG. 2(c) is a sectional view showing the holder taken along line B-B in FIG. 2(b).

It is preferable that the holder 6 is formed of a metal, such as stainless steel, iron, and aluminum. In FIGS. 1, 2(b), and 2(c), the holder 6 includes a tapered portion 8 of a dish-shaped form for a header of the squib 5 to be inserted and fitted in, a crimping lug 9 to hold the closing plug B of the squib 5 by crimping, a crimping lug 10 to hold the first cup case 3 by crimping, and a bottom 81 of the tapered portion 8. The materials that may be used for the closing plug B include, for example, polybutylene terephthalate, polyethylene terephthalate, NYLON-6, and NYLON-66. The holder 6 has holes 13, 14 formed in the bottom 81 of the dish-shaped, tapered portion 8, to permit the passage of two electrode pins 11, 12 standing from the squib 5. The two electrode pins 11, 12 provided in the closing plug B of the squib 5 extend outwardly from the holes 13, 14. The electrode pins 11, 12 are preferably formed of an alloy containing nickel, iron, and stainless. The closing plug B has, in a bottom 16 thereof, projecting portions 19, 18 which are integrally formed to cover root portions of the electrode pins 11, 12. The bottom 16 of the closing plug B is covered with the bottom 81 of the tapered portion 8 of the holder 6, as shown in FIG. 2(a). By virtue of this, even when the closing plug B is softened at the ignition in a high temperature state, the electrode pins 11, 12 are prevented from being dropped out together with the closing plug B by the portion (bottom 81) of the holder 6 where the holes 13, 14 are formed. It is preferable that an area of the hole 13, 14 is in range of more than one time to ten times or less, preferably two times to ten times, or further preferably two times to seven times, as large as a cross-section area of the electrode pin 11, 12. In addition to the holes 13, 14, one or two or more additional holes may be formed, but the formation of only the two holes 13, 14 is advantageous in terms of reduction of the manufacturing cost.

When the closing plug B of the squib 5 is held by the holder 6, a sealing member 15, such as an O-ring, is disposed between the holder 6 and the closing plug B of the squib 5, to provide moisture proofing between the squib 5 and the holder 6. Although no particular limitation is imposed on the material of the sealing member 15, the material through which it is hard for water to pass, such as nitrile rubber, silicon rubber, and ethylene propylene rubber, are preferably used for the sealing member 15. The sealing member is preferably arranged around the entire circumference of the connection between the holder and the squib.

The gas generant 2 is packed in the first cup case 3 in direct contact with the inside surface of the first cup case 3 without any intermediary of filter and/or coolant. It is to be noted here that the gas generant comprising a nitrogen-containing organic compound as a fuel component, an inorganic compound as an oxidizing agent component, and an additive comprising at least one additive can be cited as the gas generant that may be preferably used. The fuel components that may be used include at least one material selected from the group consisting of aminotetrazole, guanidine nitrate, and nitroguanidine. The oxidizing agent components that may be used include at least one material selected from the group consisting of strontium nitrate, ammonium nitrate, potassium nitrate, ammonium perchlorate, and potassium perchlorate. The additives that may be used include molybdenum trioxide of a self-ignition catalyst. A binder can also be cited as the additive to be added to the gas generant. The binders that may be used include at least one material selected from the group consisting of guar gum, methyl cellulose, carboxymethyl cellulose, water-soluble cellulose ether, and polyethylene glycol. Gas generant comprising 5-aminotetrazole and guanidine nitrate as the fuel component, strontium nitrate and ammonium perchlorate as the oxidizing agent component, molybdenum trioxide as the self-ignition catalyst, and guar gum as the binder can be cited as a preferable gas generant. Further, a gas generant comprising 10-30 mass % 5-aminotetrazole and 15-35 mass % guanidine nitrate as the fuel component, 10-30 mass % strontium nitrate and 15-35 mass % ammonium perchlorate as the oxidizing agent component, 1-10 mass % molybdenum trioxide as the self-ignition catalyst, and 1-10 mass % guar gum as the binder can be cited as a further preferable gas generant. The gas generant used in the present invention can be formed in any desired form to be packed in the seatbelt pretensioner and the like. No particular limitation is imposed on the form of the gas generant. The gas generant can be formed in a columnar form or a pellet form. Specifically, (a) 0.25%-5% cationic binder, (b) 0.25%-5% anionic binder, (c) fuel, (d) oxidizing agent, and (e) water or solvent, which is added according to a type of a combustion moderator used, are mixed uniformly and, thereafter, the resultant mixture is kneaded, extruded and cut in a columnar form or is formed in a pellet form by using a tableting machine and the like.

The first cup case 3 has a large-diameter cylindrical portion 3a and a double-sided portion 3b, having a substantially closed-end cylinder form extended in diameter in one stage from a bottom side thereof. A plurality of linear notches 3c are formed in the bottom of the fist cup case 3.

The notches 3c are broken by the gas generated by the burning of the gas generant 2 packed in the first cup case 3, so that the generated gas is emitted directly to the seatbelt pretensioner not shown. The first cup case 3 has, in an opening end thereof, a flanged portion 3d formed to extend radially outwardly and is fixed to the holder 6 by crimping crimping lugs 10 provided in the holder 6. The materials that may be used for the first cup case 3 include metals such as stainless, iron and aluminum.

Figure 6:
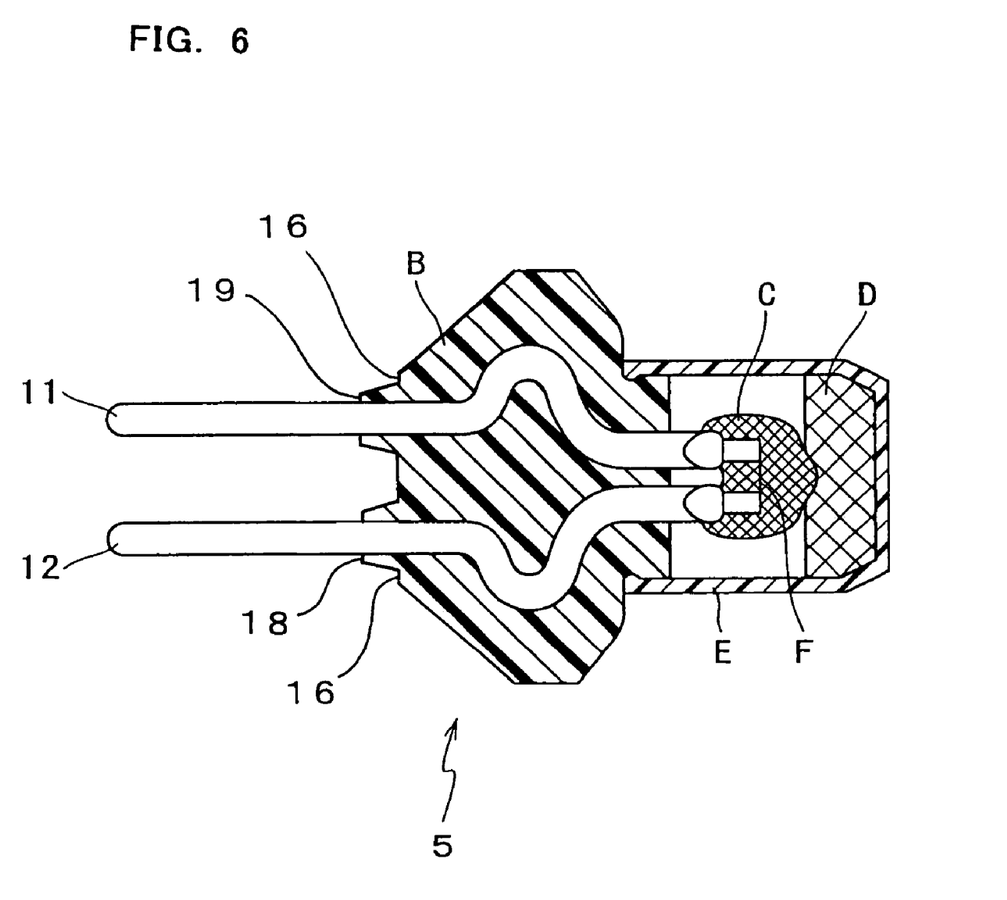
FIG. 6 is an external view showing the squib according to the present invention.

The squib 5 includes an ignition charge D, a second cup case E packed with the ignition charge D, two electrode pins 11, 12 provided in an upstanding condition to allow the passage of electric current to ignite the ignition charge D, and header B, as shown in FIG. 6. The second cup case E is usually made of thermoplastic resin. The electrode pins 11, 12 project in the interior of the second cup case E and are electrically connected to each other at their front ends through an electric bridge-circuit wire F. The electric bridge-circuit wire F is covered with a firing agent C contacting with the ignition charge D. The closing plug B is formed of a resin in order to provide electrical insulation between the respective electrode pins 11, 12 except the portions thereof corresponding to the electric bridge-circuit wire. In the squib 5 in accordance with this embodiment, the closing plug B has projecting portions 19, 18 which are integrally formed to cover root portions of the electrode pins 11, 12 projecting from the closing plug B, as shown in FIG. 6. The projecting portions 19, 18 have diameters smaller than the holes 13, 14 and are formed of the same material as that of the closing plug B so as to be integral with the closing plug B. This can surely provide the electrical insulation between the electrode pins 11, 12 and the holder 6.

A shorting clip 17 to keep the two electrode pins 11, 12 in a shorted state is fitted in the squib 5, as shown in FIG. 1. The shorting clip 17 serves to prevent improper operation caused by static electricity.

The squib case 7 is formed in a cup-like shape to cover a front end of the second cup case E of the squib 5 and a front end of the closing plug B of the squib 5. Also, the squib case 7 has, at an open end portion thereof, a flanged portion 7a formed to extend obliquely in a radially outward direction along the front end portion of the closing plug B. The squib case 7 is secured to the holder 6 together with the closing plug B of the squib 5 by crimping the crimping lug 9 in such a maimer as to fold them over onto the flanged portion 7a. Since the second cup case E of the squib 5 is covered with the squib case 7, the force to constrain the second cup case E is increased, so that when the enhancer agent in the squib 5 is ignited and burnt, the second cup case E is prevented from being broken before an internal pressure of the squib 5 is increased, thus permitting the burning of the ignition charge under the high-pressure state. This can provide an increased burning velocity, as compared with the conventional gas generator, thus preventing delay in the ignition of the gas generator 1.

The squib case 7 is formed of materials including metals, such as iron, aluminum and stainless, and resins, such as PBT (polybutylene terephthalate), PET (polyethylene terephthalate), PA6 (NYLON-6), and PA66 (NYLON-66), PPS (polyphenylene sulfide), PPO (polyphenylene oxide), and fluorocarbon resin. The flame leading hole 20 extending through the squib case 7 is formed in the squib case 7 in a surface thereof contacting with the gas generant 2. From the standpoints that the high-temperature gas and the particles from the squib 5 are solely oriented toward the gas generant 2 and that the second cup case E is prevented from being broken too quickly, it is preferable that the flame leading hole 20 is formed in the bottom of the closed-end cylinder of the squib case 7 covering the second cup case E. Although it is preferable that the flame leading hole 20 is formed in the bottom of the closed-end cylinder of the squib case 7, the flame leading hole 20 may be formed in a cylindrical portion of the cylinder of the squib case 7. Although the squib case 7 need not necessarily be formed by a single member but may be formed by combination of several members, it is preferably formed by a single member in terms of reduction in component count. The squib case 7 may be in a meshed form.

Also, it is preferable that the squib case 7 is formed to have an inner configuration corresponding to an outer configuration of the second cup case E of the squib 5, to allow the second cup case E of the squib 5 and the squib case 7 to be in substantially close contact with each other. The gap between the second cup case E and the squib case 7 is preferably 1 mm or less, or further preferably 0.2 mm or less.

This structure prevents moisture from entraining in the gas generant 2. In addition, since the squib case 7 is arranged to cover the second cup case E of the squib 5 and is also formed to have the flame leading hole 20 oriented toward the gas generant 2, the energy of the squib 5 is solely oriented toward the gas generant 2. Also, since the second cup case E of the squib 5 is covered with the squib case 7, the force to constrain the second cup case E is increased. Hence, when the ignition charge D in the squib 5 is ignited and burnt, the second cup case E is prevented from being broken before the internal pressure of the squib 5 is increased, thus permitting the burning of the ignition charge under the high-pressure state. This can provide an increased burning velocity, as compared with the conventional gas generator, thus preventing delay in the ignition of the gas generator 1.

Figure 4:
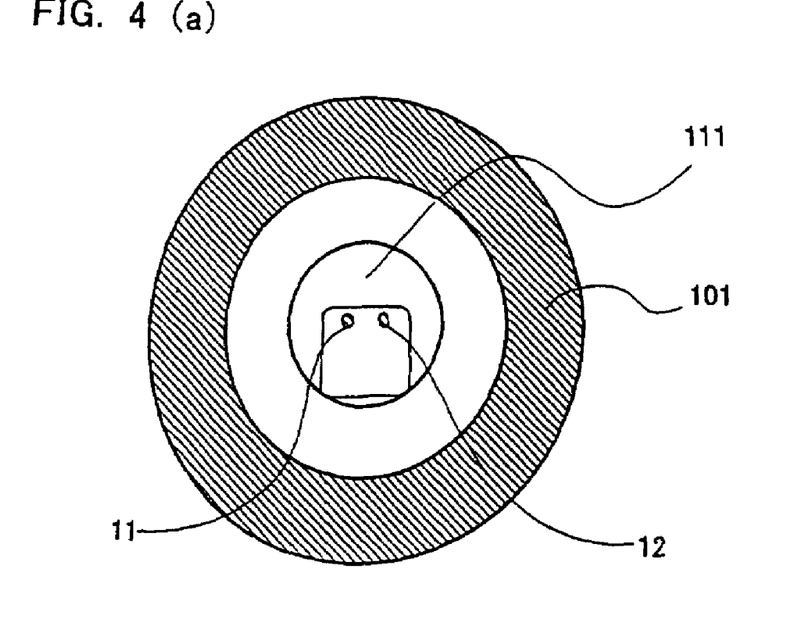
FIG. 4(a) is a sectional view showing the gas generator taken along line A-A in FIG. 3.
FIG. 4(b) is an external view of a conventional holder used as viewed from a bottom thereof in FIG. 3.

On the other hand, as a result of the increase in strength of the second cup case E, a force to cause the electrode pins 11, 12 to drop out together with the closing plug B is exerted on the electrode pins 11, 12 when the closing plug B is softened at the ignition in the high-temperature state. However, since the bottom 16 of the closing plug B is covered with the holder 6 to reduce the areas of the holes facing the bottom 16 of the closing plug B so as to reduce the shear area of the resin, as compared with the conventional squib structure (Cf. FIG. 3 and FIG. 4(a), (b)), drop-out of the electrode pins 11, 12 together with the closing plug B is prevented. Although the electrode pins having bent portions in the interior of the closing plug B have been illustrated above in the embodiment, there may be cases where straight pins can be used for the electrode pins used in the squib of the gas generator according to the present invention, depending on the material of the electrode pins, the diameters of the pins, etc. Even in this variant, since the areas of the holes formed in the bottom 16 of the closing plug B and facing the bottom 16 of the closing plug B are reduced and thus the shear area of the resin is reduced, as mentioned above, it is probable that the drop-out of the electrode pins 11, 12 is prevented.

The gas generator 1 thus constructed can be produced in the following steps. First, the electrode pins 11, 12 of the squib 5 are inserted into the holes 13, 14 of the holder 6. Then, the squib 5 is mounted on the tapered portion 8 of the holder 6 through the sealing member 15. Then, after the squib case 7 forming the flame leading hole 20 therein is mounted on the squib 5 to cover the surface of the squib 5, the squib 5 and the squib case 7 are integrally mounted on the holder 6 by crimping the crimping lug 9. Then, the first cup case 3 packed with the gas generant 2 is fitted in the holder 6 fixedly mounting the squib 5 and the squib case 7 thereon and is fixed thereto by crimping the crimping lugs 10.

Now, operation of the gas generator 1 will be described. When automobile collision is detected by a collision sensor, not shown, the electric current passes through the electrode pins 11, 12 standing from the squib 5 shown in FIG. 6. Then, the electric bridge-circuit wire F in the squib 5 generates heat and thereby the firing agent C is ignited. Sequentially, the ignition of the firing agent C causes the ignition and burning of the ignition charge D. As the burning of the ignition charge D proceeds, the interior of the squib 5 is increased in temperature and pressure. However, since the second cup case E of the squib 5 is covered with and reinforced by the squib case 7, as shown in FIG. 1, the squib 5 is prevented from being expanded and broken before the ignition charge D is fully burnt. At that time, the electrode pins 11, 12 are also prevented from being dropped out by the holder 6 in the high temperature state.

As the pressure increases, the burning velocity of the gunpowder or explosive used for the ignition charge increases. As a result, the squib 5 is broken earlier, as compared with the squib not covered with the squib case 7. As the burning of the ignition charge proceeds, the gas and the particles as increased in temperature and pressure are emitted toward the squib case 7. Specifically, the interior of the squib case 7 is increased in temperature and pressure by the burning of the ignition charge. At that time, the high-temperature and high-pressure gas is spurted to the gas generant 2 packed in the first cup case 3 at one burst through the flame leading hole 20 of the squib case 7. Then, the gas generant 2 is ignited. Since the squib case 7 is fixed to the holder 6 by crimping, the squib case 7 is prevented from being blown toward the gas generant 2.

Sequentially, the inner pressure of the first cup case 3 is increased rapidly by a large quantity of gas generated in the interior of the first cup case 3 by the burning of the gas generant 2. Then, the notches 3c formed in the bottom of the first cup case 3 are broken timely, so that the gas is led to the seatbelt pretensioner, not shown, and thereby the seatbelt pretensioner is operated.

In the following, the present invention is described with reference to Examples.

EXAMPLES

The heat test of the gas generator having the structure shown in FIG. 1 was conducted by heating the gas generator by use of a burner. In this heat test of the gas generator, the squib was fixed to the aluminum holder through an O-ring and, then, the aluminum cup case in which the gas generant was sealed was positioned in and joined to a recessed portion of the holder and then fixed thereto by crimping. The heat test was conducted using a cylindrical jig fitting the propane burner and the squib in an upper portion thereof; having an interior volume of about 3.5 cc; and having a gas discharge hole of a diameter of 1 mm formed in the bottom. In the heat test, the jig was set over the platform, with its gas discharge hole down and, then, the propane burner was set immediately under it. The distance between a front end of a flame spurting nozzle of the propane burner and a bottom of the jig was set to be 400 mm, and the height of the flame spurted from the propane burner was set to be 600 mm by visual observation. The heat test using the propane burner was conducted until the gas generant was ignited by the heating of the propane burner, followed by the generation of the gas from the gas generant. Since an explosion sound is most often associated with the ignition of the gas generant, one can confirm the ignition from the explosion sound. In the following discussion, the specifications of the squibs used in the heat test and the test results are shown. It should be noted that the modified holder each have holes having diameters of 2.3 mm, one for each of the electrode pins, to allow the passage of the electrode pins of the diameter of 1 mm. The samples tested were prepared, three for each of the specifications.

Comparative Example

For comparison purposes, the conventional gas generator having the electrode pins projecting directly from the holder was used.

Figure 7:
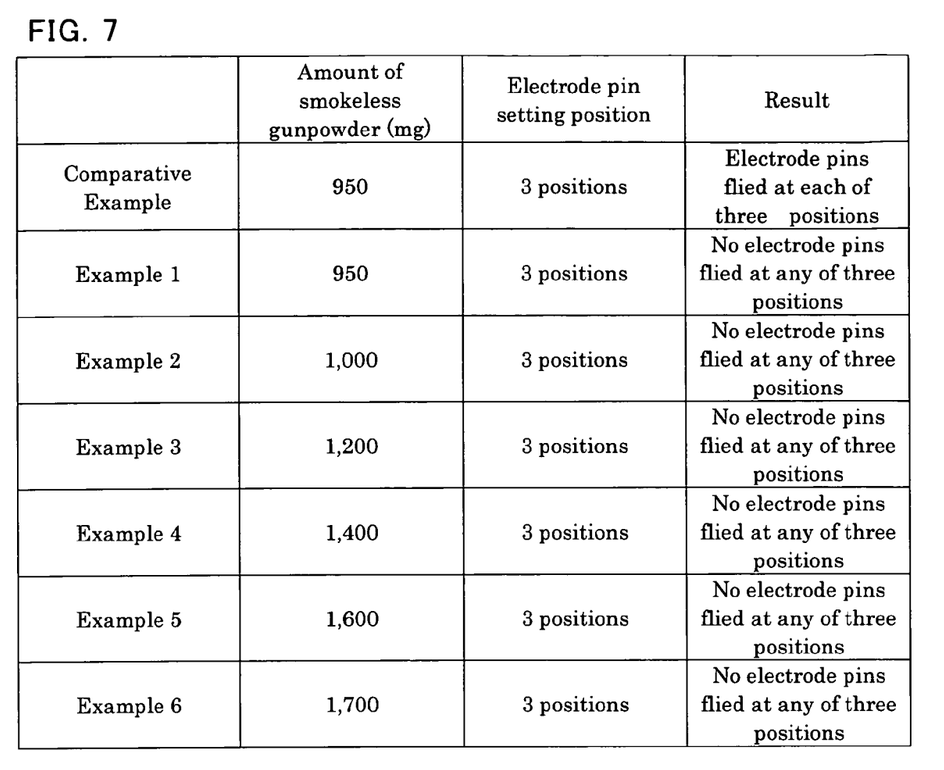
FIG. 7 is a table in which the heat test results of the examples are tabulated.

The heat test results are tabulated and shown in FIG. 7.

As shown in FIG. 7, in the conventional gas generator of Comparative Example, the electrode pins flied when 950 mg of smokeless gunpowder was used, while on the other hand, in the gas generators of Examples, no materials including the electrode pins flied until 1,700 mg of smokeless gunpowder was used. It is found from these facts that the gas generator according to the present invention is effective for preventing flying resulting from the softening of the resin of the closing plug of the squib in the heat test, as comparing with the conventional gas generator.

Capability of Exploitation in Industry

In the gas generator of the present invention, the holder has the holes formed to allow the passage of the electrode pins provided in the squib and also covers a bottom portion of the closing plug of the squib formed of resin. By virtue of this, even when the squib is ignited in the high temperature state, the electrode pins can be prevented from being dropped out together with the closing plug, to assure the reliability for the gas generator even when used in the high-temperature state.

The invention claimed is:

1. A gas generator comprising a first cup case packing therein gas generant to generate a gas by burning, a squib having a second cup case arranged in an inside of the first cup case and containing an ignition charge, a squib case having a hole and covering the second cup case, and a holder made of metal to hold the squib case and second cup case by crimping, wherein the holder has first and second holes for allowing passage of electrode pins of the squib, one for each of the electrode pins;

wherein the squib contains the ignition charge, a closing plug is inserted in and fitted in the second cup case to house the ignition charge in the second cup case, the closing plug is mounted in the holder, and the electrode pins of two metal rods extend through the closing plug and project outward therefrom, and wherein root portions of the respective electrode pins projecting from the closing plug are covered with respective projecting portions integrally formed with the closing plug, and the projecting portions are inserted in the holes, respectively.

2. The gas generator according to claim 1, wherein an area of the holes is in range of two times to ten times as large as a cross-section area of the electrode pin.

* * * * *